April 17, 1956  R. E. BORCHARDT  2,742,125
DRIVE MECHANISM
Filed July 26, 1952  2 Sheets-Sheet 1
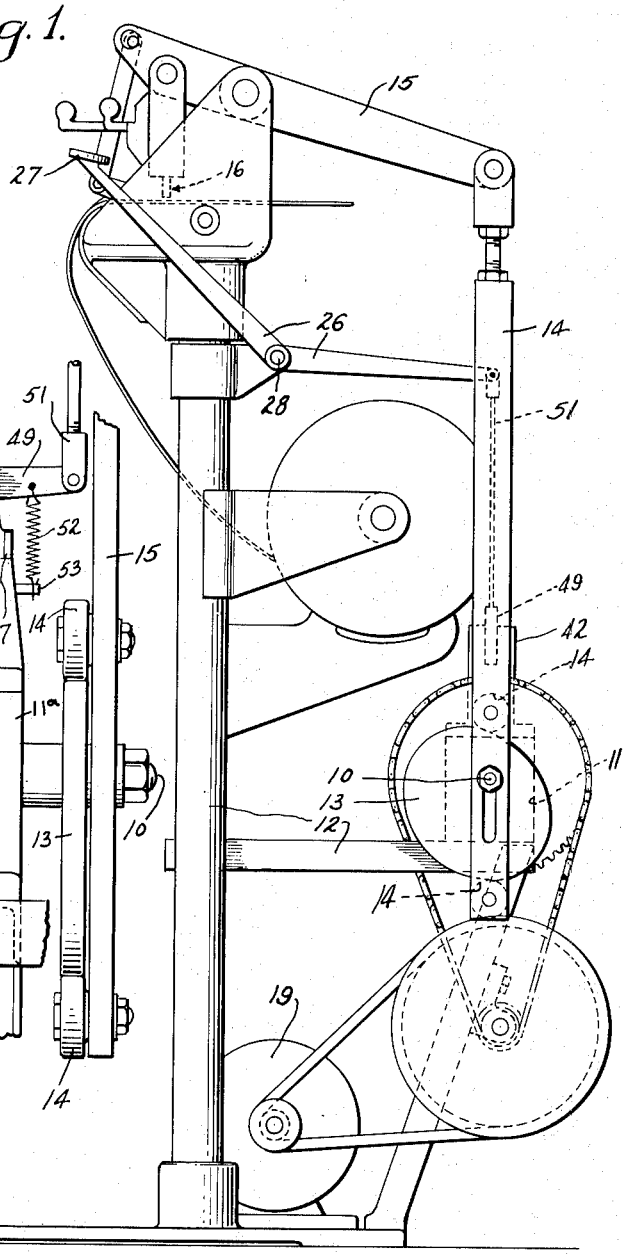
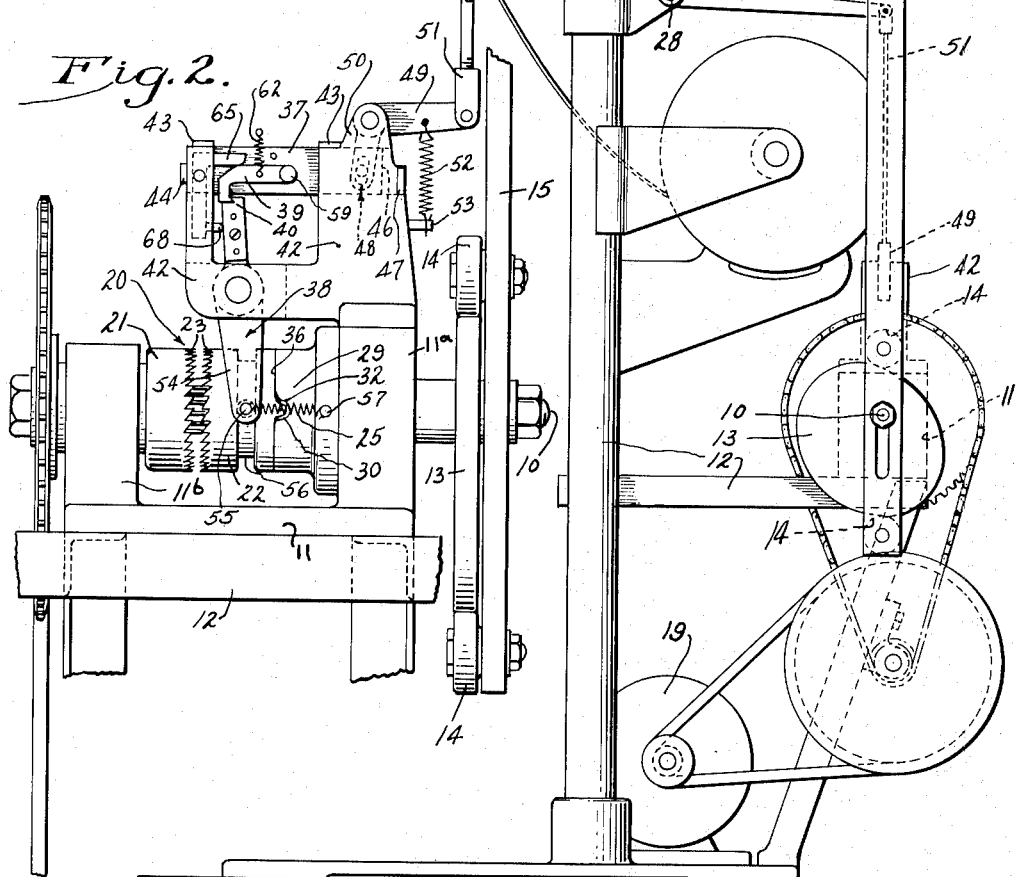
INVENTOR.
Robert E. Borchardt
BY
ATTORNEYS

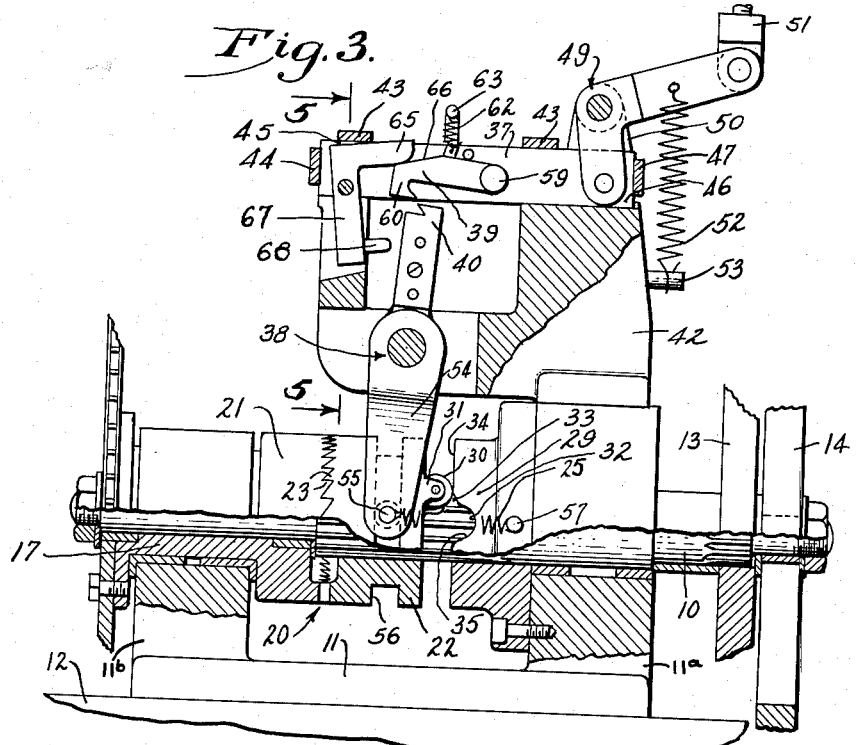

United States Patent Office 2,742,125
Patented Apr. 17, 1956

2,742,125

DRIVE MECHANISM

Robert E. Borchardt, Rockford, Ill., assignor to Barber-Colman Company, Rockford, Ill., a corporation of Illinois Application July 26, 1952, Serial No. 301,113

11 Claims. (Cl. 192—24)

This invention relates to drive mechanisms of the type in which the toothed members of a clutch are shifted into engagement with each other under manual control and held engaged by the action of a cam by which the toothed members are disengaged after movement of the driven member through a desired range for example one revolution.

The primary object is to incorporate in a clutch control of the above character a novel mechanism responsive to partial engagement of the clutch to disable the manual control until the driven member has completed its limited movement and the manually operable actuator has been released and fully returned to its idle position, thereby preventing starting of a second cycle if the operator fails to release the actuator properly.

Another object is to achieve the foregoing object through the provision of a novel connection between the actuator and the driven clutch member which connection is broken automatically after partial engagement between the clutch members regardless of the position in which the operator holds the actuator.

A more detailed object is to utilize the motion of the driven clutch member between its positions of partial and full engagement with the driving member in a novel manner to effect the automatic disengagement of latch elements which provide the breakable connection between the driven member and the manually movable actuator.

Other objects and advantages of the invention will become apparent from the following detailed description taken in connection with the accompanying drawings, in which Figure 1 is an elevational view of a punch press which incorporates the improved drive mechanism embodying the novel features of the present invention.

Fig. 2 is an enlarged elevational view of the drive mechanism showing the parts in clutch disengaged positions.

Fig. 3 is a view similar to Fig. 2 with the parts in clutch-engaged positions and some of the parts shown in section.

Fig. 4 is a fragmentary enlarged view similar to Fig. 3 with the parts in different positions.

Fig. 5 is a sectional view taken along the line 5—5 of Fig. 3.

In the drawings, the invention is shown for purposes of illustration embodied in a mechanism for limiting the rotary motion of a driven shaft 10 which is journaled in a part 11ᵃ of a bracket 11 on the frame 12 of a pattern punch press and acts through a cam 13, followers 14, and a lever 15 to effect a working stroke of a punch 16 (Fig. 1) once during a limited movement, such as one revolution, of the shaft. A drive shaft member 17 co-axial with the driven shaft is journaled on one end of the latter and in another part 11ᵇ of the bracket 11 on the frame 12 and has a drive connection with an electric motor 19 for continuous rotation of the drive shaft member when the motor is energized.

Motion is transmitted from the drive shaft member 17 to the driven shaft 10 by a clutch 20 which, in the present instance, is of the one-revolution jaw type having normally disengaged driving and driven members 21 and 22 formed with axially facing teeth 23. Engagement and disengagement of these teeth are effected by axial movement of the driven clutch member toward and away from the driving member. The latter is formed integral with the drive shaft member 17 and the driven member is splined on the driven shaft 10 and normally urged, as by contracile springs 25, away from the driving member and into a clutch disengaged position as shown in Fig. 2. A manually movable trip lever 26 (see Fig. 1) having a handle 27 and pivoted at 28 on the frame 12 is connected to the driven member 22 to move the latter axially into engagement with the driving member.

To provide full engagement between teeth 23 of the clutch members 21 and 22 for only one revolution of the driven shaft 10 followed by release of the clutch, a cam mechanism (see Fig. 3) is interposed between the driven member 22 and the bracket part 11ᵃ which supports the driven shaft. In this instance, the cam 29 is formed on the bracket as a stationary annular surface facing axially toward the driven member. Cooperating with the cam is a follower roller 30 which is rotatably mounted on a lug 31 formed on the driven member and projecting axially therefrom toward the cam. A notch 32 on the latter receives and positively locates the follower roller in the clutch disengaged position shown in Fig. 2. Adjacent the notch is a rise 33 which is effective when the clutch teeth are only partially engaged by movement of the trip lever 26 and the driven member is rotated by such partial engagement. The rise urges the rotating follower out of the notch 32 and onto a dwell surface 34 first to move the driving member farther toward and into full engagement with the driven member as shown in Fig. 3 and then to hold the driven member in such engagement while it rotates. As the driven member completes one revolution, the roller moves from the dwell 34 to a fall 35 and then back into the notch, thereby permitting the driven member to move axially and out of engagement with the driving member.

In accordance with the present invention, the connection between the clutch and the trip lever 26 is made disengageable and the making and breaking of the connection is controlled in a novel manner to positively preclude the starting of another cycle by manipulation of the trip lever until the cycle has been fully executed and the trip lever is returned fully to its idle position after initiating a cycle. To this end, the cam 29, in addition to its normal function of moving the driven clutch member into and out of full engagement with the teeth of the driving member is utilized to perform the additional function of so breaking the clutch control connection in response to the initial turning of the driven member that the connection will remain disabled until the trip lever is returned to its idle position and the cycle has been completed. Thus, manual control over the actuation of the clutch is lost automatically as soon as partial engagement between the clutch members occurs and is not restored until all of the parts have been returned to their initial positions.

Generally, the novel control connection comprises an actuator 37 which is connected by linkages to the trip lever for movement back and forth between a first or idle position and a limit position, an operating lever 38 which is connected to the driven clutch member to move the latter into partial engagement with the driving member 21 when the lever moves from a first or active position to an intermediate position and which is movable beyond the intermediate position to an inactive position by movement of the driven member into full engagement with the driving member under the action of the cam 29, and latch elements 39 and 40 which are mounted on the actuator and the operating lever to transmit to the latter the motion of the actuator as it moves from its idle to its limit position. The latch elements are so positioned on the actuator 37 and the lever 38 that they are engaged and move the latter into its intermediate position in the movement of the actuator into its limit position but are disengaged automatically by movement of the lever to its inactive position when the driven member is urged by the cam 29 into its full engagement with the driving member.

In the present instance, the actuator 37 is an elongated rectangular slide mounted above the clutch 20 in a guide groove 41 on a bracket 42 of the frame 12 for endwise reciprocation longitudinally of the driven shaft 10 and held in the groove by plates 43 bolted to the bracket. Endwise movement of the actuator toward its idle position shown in Fig. 2 is limited by a plate 44 bolted to the bracket and engageable with one end 45 of the actuator while endwise movement in the opposite direction toward the limit position shown in Figs. 3 and 4 is limited by engagement of the opposite end 46 of the actuator with another plate 47 bolted to the bracket. At its latter end, the actuator has a pivotal and sliding connection 48 with one end of a bell crank 49 which is pivoted intermediate its ends on lugs 50 projecting upwardly from the bracket and, at its other end, is pivotally connected to one end of a link 51. The other end of the latter is pivotally connected to the trip lever 26 so that, when the handle 27 on the lever is depressed, the actuator is moved from its idle position shown in Fig. 2 to its limit position shown in Fig. 3. A contractile spring 52 stretched between the bell crank 49 and a pin 53 projecting from the bracket urges the actuator toward its idle position and the handle 27 to a raised idle position.

The operating lever 38 in this instance is pivoted intermediate its ends on the frame bracket 42 for swinging about an axis disposed above and extending transversely of the driven shaft 10 and, at its upper end projects upwardly toward the slide. At its other end 54, the operating lever is bifurcated and projects downwardly to straddle the driven clutch member 22. The connection between the latter and the lever permits rotation of the member relative to the lever and pivoting of the lever about its fulcrum and comprises trunnions 55 projecting inwardly from the bifurcated lever ends and into an annular groove 56 extending around the driven member. The contractile springs 25 which urge the driven member axially out of engagement with the driving member 21 are stretched between pins 57 on the bracket and the trunnions 55 on the operating lever and urge the latter toward its active or clutch disengaged position as well as the driven member away from the driving member.

One latch element 39 is carried on the actuator 37 intermediate the ends 45 and 46 thereof and projects downwardly therefrom into the path of the other element 40 which is carried on the upper end of the operating lever 38 for engagement of the elements when the lever and actuator are in their active and idle positions respectively (see Fig. 2) and during movement of the actuator into its limit position. The actuator 37, being in its limit position when the operating lever 38 is in its intermediate position, the latch elements 39 and 40 are automatically moved out of engagement with each other when the lever is moved beyond its intermediate position and into its inactive position (see Fig. 3) by the cam 29.

To avoid re-engagement of the latch elements 39 and 40 when the lever 38 moves back from its inactive position and into its intermediate position before the actuator 37 moves back to its idle position, one of the elements is pivotally supported to swing into and out of the path of the other element and is normally urged out of this path. In this instance, the actuator latch element 39 is the movable one being generally L-shaped with one end pivoted at 59 on the actuator and the other end 60 hook-shaped and swingable transversely of and into and out of the path of the other element 40. The latter is secured as by a screw 61 to the upper lever end and is hook-shaped, the hooked portions of the elements facing toward each other. A contractile spring 62 is stretched between the pivoted element 39 and a finger 63 on the actuator to urge the pivoted element upwardly, such upward movement being limited by a pin 64 which projects outwardly from the actuator to engage the element after the latter has swung upwardly out of engagement with the fixed element 40.

The hook 60 of the pivoted latch element 39 is moved downwardly and back into the path of the fixed hook 40 automatically with the movement of the actuator 37 back into its idle position by a cam 65 which is positioned on the frame bracket 42 to engage a follower surface 66 on the top of the pivoted element as the actuator moves into its idle position. To permit movement of the pivoted hook past the fixed hook and then into latching engagement therewith in the event that one revolution of the driven shaft 10 is completed and the operating lever 38 moves back into its active position before the hand lever is released for movement of the actuator back into its idle position, the cam 65 is formed on one end of a lever 67 which is pivoted intermediate its ends on the frame bracket and, at its other end, carries a stud 68 engageable with the upper end of the operating lever. When the actuator moves into its idle position with the operating lever already in its active position, the bottom of the pivoted hook 60 rides along a flat surface 69 on the top of the fixed hook 40 and the follower surface 66 on the pivoted hook engages the cam 65 and urges the lever 67 thereof about its pivot in a counterclockwise direction as viewed in the drawings, the stud 68 being so positioned that, in this movement of the cam lever, the operating lever is pushed slightly out of its active position. This movement of the operating lever is small enough to avoid engaging the clutch teeth 23 but large enough to permit the pivoted hook to move downwardly into latching engagement with the fixed hook. To insure swinging of the operating lever by the cam lever 67, the spring 52 for returning the actuator to its idle position is stronger than the combined strengths of the springs 25 for urging the operating lever into its clutch disengaged or active position.

In operation, assuming the parts to be in their clutch disengaged and idle positions and the latch elements 39 and 40 interengaged as shown in Figs. 1 and 2, depression of the handle 27 results in movement of the actuator 37 to the right from its idle position to its limit position shown in Figs. 3 and 4. Such movement is transmitted through the latch elements to the operating lever 38 which, in turn, moves from its active position to its intermediate position and urges the driven clutch member 22 into partial engagement with the driving member 21 resulting in rotation of the driven member and movement of the follower roller 30 along the cam 29. The latter urges the driven member axially into full engagement with the driving member and the operating lever into its inactive position. When the operating lever moves into its inactive postion, the fixed hook 40 is moved beyond and out of engagement with the pivoted hook 60 which is then permitted to move under the action of its spring 62 and upwardly out of the return path of the fixed hook.

The driven shaft continues to rotate and, at the end of one revolution thereof, the follower roller 30 on the driven member 22 rides from the dwell 34, down the fall 35, and into the notch 32 of the cam 29 whereby the driven member is moved by the springs 25 axially out of engagement with the driving member. During such movement of the driven member, the operating lever moves from its inactive position and back into its active position.

Assuming that the actuator is retained in its limit position through failure of the operator to release the handle 27 before completion of the revolution, the pivoted hook will remain raised out of the path of the fixed hook during the return of the operating lever and the fixed hook will move under the pivoted hook as shown in Fig. 4.

The hooks thus remain out of latching engagement and the upper operating lever end moves into engagement with the stud 68 on the cam lever. With the parts in these positions, release of the handle 27 results in the movement of the actuator by its spring 52 into its idle position, the follower surface 66 of the pivoted latch element 39 engaging the cam 65 in this movement to swing the lever 67 about its pivot and push the operating lever out of the active position for downward movement of the pivoted hook. Once the latter has moved back into the path of the fixed hook, the operating lever swings the cam lever 67 back and moves back into its active position, the parts then being all returned to their idle position from which a new cycle may be started.

Assuming that the operator releases the handle 27 after the driven clutch member 22 has been moved into partial engagement with the driving member 21 and before one revolution of the driven shaft has been completed, the actuator will return immediately to its idle position and the latch elements 39 and 40 will become disengaged by their movement away from each other, the pivoted element moving with the actuator and into engagement with the cam 65 to swing the cam lever in a counterclockwise direction as viewed in the drawings. The fixed latch element, as before, moves with the operating lever 38 into its inactive position where it remains until one revolution of the drriven shaft is completed. Then, the operating lever moves back into its active position, its upper end in such movement engaging the stud 68 and swinging the cam lever 67 in a clockwise direction so that the cam 65 engages the follower surface 66 of the pivoted latch element and urges the pivoted hook down into engagement with the fixed hook where all of the parts are again in their idle positions.

From the foregoing, it will be apparent that the latch elements 39 and 40 are automatically disengaged upon axial movement of the driven clutch member 22 by the cam 29 into full engagement with the driving member. Thus, the cam breaks the connection between the trip lever 26 and the driven member in addition to urging the driven member axially toward the driving member. Such automatic disengagement of the latch elements completely disables the manual control of the clutch by the handle 27 until the latter has been released and in addition the driven shaft 10 has completed one revolution. With this construction, the operator cannot initiate another cycle simply by holding the handle 27 down through one revolution of the driven shaft 10 or by only moving the handle partially.

I claim as my invention:

1. In a drive mechanism including a clutch having a rotary driving member and a rotary driven member movable axially into and out of engagement with the driving member, the combination of, an operator connected to said driven member and movable therewith back and forth between clutch engaged and disengaged positions through an intermediate position, a manually operable actuator movable between idle and limit positions, a disengageable connection between said operator and said actuator including first and second latch elements on the operator and actuator respectively engageable when the operator and the actuator are in their clutch disengaged and idle positions and disengaged by movement of the operator beyond its intermediate position toward and into its clutch engaged position, said second latch element being mounted on said actuator for movement into and out of the path of said first latch element and yieldably urged away from said path, a lever fulcrumed intermediate its ends on a fixed pivot and having one end engageable with said operator for swinging of the lever about its fulcrum when the operator is moved into said clutch disengaged position, and cam and follower surfaces formed on the other end of said lever and on said second latch element and operable when engaged to urge the second latch element back into the path of and into engagement with said first latch element, said surfaces being positioned on said lever and said second latch element to engage each other when said actuator is moved into said idle position and said lever is swung about its fulcrum by movement of said operator into its clutch disengaged position.

2. In a drive mechanism including a clutch having a rotary driving element and a rotary driven element movable axially into and out of engagement with the driving element, the combination of, an operating member connected to said driven element and movable back and forth between a first position and a clutch engaged position through an intermediate position, a manually operable actuating member movable between first and limit positions, a disengageable connection between said members including first and second latch elements on the members engageable when the latter are in said first positions and disengaged by movement of the operating member from said intermediate position toward and into said clutch engaged position thereof, means movably mounting said second latch element on its member and yieldably urging the element out of the path of the other element when the elements are disengaged, a lever fulcrumed intermediate its ends on a fixed pivot and having one end engageable with the one of said members carrying said first element to swing the lever about its fulcrum when the member is moved into its first position, and cam and follower surfaces formed on the other end of said lever and said second latch element and operable when engaged to urge the second latch element back into the path of and into engagement with said first latch element, said surfaces being positioned on said lever and said second latch element to engage each other when said members move into said first positions and said member carrying said first latch element engages said lever portion and swings the lever about its fulcrum.

3. In a drive mechanism including a frame and a clutch mounted thereon and having rotary driving and driven members engageable and disengageable by axial shifting of the driven member, the combination of, an operator connected to said driven member and movable back and forth between clutch engaged and disengaged positions through an intermediate position, a manually operable actuator movable longitudinally of said operator and back and forth between a first position and a limit position, first and second latch elements mounted on said operator and said actuator respectively and engageable with each other when the operator and actuator are in said clutch disengaged and first positions to transfer the motion of the actuator to the operator and move the latter to said intermediate position as the actuator is moved into said limit position, said first latch element being carried on said operator beyond and out of engagement with said second latch element when the operator moves into said clutch engaged position, means mounting one of said latch elements to move into and out of the path of the other element and yieldably urging the element out of the path of the other element after disengagement of the elements to permit the latter to move past each other without reengaging in the return movements of said operator and said actuator toward said clutch disengaged and idle positions, and means operable in response to the movements of both said operator and said actuator into their respective clutch disengaged and first positions to shift said movable latch element back into the path of and into engagement with the other of said elements.

4. A drive mechanism having, in combination, a clutch having rotary driving and driven members with teeth thereon engageable and disengageable by axial shifting of the driven member, means operable after partial engagement of said teeth to shift said driven member into full engagement with the driving teeth, means operable to shift said driven member to a disengaged position after a predetermined limited movement thereof with said driving member, an operator movable with said driven member in a path extending axially of the latter and back and forth between clutch engaged and disengaged positions through an intermediate position in which said clutch teeth are only partially engaged, an actuator movable in a path extending longitudinally of and adjacent said operator path and toward and away from an idle position, a hook mounted on said actuator and movable therewith along said path thereof, a second hook mounted on said operator and extending therefrom into the path of said first hook to engage the latter and transmit the motion of said actuator away from said idle position to said operator and said driven clutch member for partial engagement of said teeth, means mounting one of said hooks for movement transversely of said paths and into and out of the path of the other hook, and means yieldably urging said movable hook out of the path of said other hook for disengagement of the hooks in the movement of said operator beyond said intermediate position and into said clutch engaged position.

5. A drive mechanism having, in combination, a clutch having rotary driving and driven members with teeth thereon engageable and disengageable by axial shifting of the driven member, means operable after partial engagement of said teeth to shift said driven member into full engagement with the driving teeth, means operable to shift said driven member to a disengaged position after a predetermined limited movement thereof, with said driving member, an operator movable with said driven member in a path extending axially of the latter and back and forth between clutch engaged and disengaged positions through an intermediate position in which said clutch teeth are only partially engaged, an actuator movable in a path extending longitudinally of and adjacent said operator path and toward and away from an idle position, a disengageable connection for transmitting the motion of said actuator to said driven clutch member to engage the clutch members in the movement of said actuator away from said idle position and including latch elements mounted on the actuator and said operator to move therewith along said paths thereof and disengageable by movement of the operator with said driven member from said intermediate position to said clutch engaged position, and means mounting one of said latch elements for movement transversely of said paths and into and out of engagement with the other of said elements and yieldably urging the element away from the other element.

6. A drive mechanism having, in combination, a clutch having rotary driving and driven members engageable and disengageable by axial shifting of the driven members, means operable in response to shifting of said driven member into partial engagement with said driving member to move the driven member into full engagement therewith, means operable after a predetermined rotary movement of the driven member, to move the latter to a clutch disengaged position, an operator connected to said driven member and movable in a path extending axially thereof from an active position to an intermediate position to shift the driven member axially into said partial engagement and from said intermediate position to an inactive position in response to movement of the driven member into said full engagement, a manually operated actuator mounted to move longitudinally of and adjacent said operator path through a range less than that of said operator and between a first position and a limit position corresponding to said active and intermediate positions of the operator, and first and second latch elements mounted on said operator and said actuator respectively and projecting laterally of said paths thereof to engage each other when the operator and the actuator are in said active and first positions and transfer the motion of the actuator to the operator for moving the latter from the active position to said intermediate position as the actuator moves into said limit position, said first latch element being carried on said operator beyond the range of movement of said second latch element and out of engagement with the latter when the operator is moved into said inactive position by movement of the driven member into said full engagement with said driving member.

7. A drive mechanism having, in combination, a clutch having rotary driving and driven members with axially facing jaws engageable and disengageable by axial shifting of the driven member, means operable after partial engagement of said jaws for shifting said driven member axially toward said driving member for full engagement of the jaws, means operable to shift said driven member away from the driving member for disengagement of the jaws after a predetermined rotary movement of the driven member, an operator connected to said driven member and movable back and forth between clutch engaged and disengaged positions through an intermediate position in which said jaws are partially engaged, a manually operated actuator mounted to move between an idle position and a limit position corresponding to said clutch disengaged and intermediate positions of said operator, and first and second latch elements mounted on said operator and said actuator respectively and engageable with each other when the operator and the actuator are in said clutch disengaged and idle positions to transfer the motion of the actuator to the operator and move the latter into said intermediate position for partial engagement of said jaws as the actuator moves into said limit position, said first latch element being carried on said operator beyond the range of movement of said second latch element and out of engagement with the latter when the operator is moved with said driven member under the action of said shifting means away from said intermediate position and into said clutch engaged position.

8. A drive mechanism having, in combination, a clutch having rotary driving and driven elements with teeth thereon engageable and disengageable by axial shifting of the driven element, means operable after partial engagement of said teeth to start said driven element and shift the latter into full engagement with the driving teeth, means operable to shift said driven element out of engagement with the driving element to a disengaged position after a predetermined limited movement of the driving element, a member connected to said driven element and movable back and forth between positions in which said clutch is engaged and disengaged through an intermediate position in which the clutch teeth are partially engaged, a manually operable actuator movable between active and inactive positions and through a range less than the range of said member, a disengageable connection between said actuator and said member for movement of the latter from its clutch disengaged position to said intermediate position to engage said clutch elements in the movement of said actuator to said inactive position, said connection including latch elements mounted on the actuator and the member and disengageable by movement of the member with said driven element from said intermediate position to said position and beyond said range of said actuator of the member in which said clutch is engaged.

9. A drive mechanism having, in combination, a clutch having rotary driving and driven members with teeth thereon engageable and disengageable by axial shifting of the driven member, means operable after partial engagement of said teeth to start said driven member and shift the latter into full engagement with the driving teeth, means operable to shift said driven member out of engagement with the driving member to a disengaged position after a predetermined limited movement of the driven member, a manually operable actuator movable between idle and limit positions, a disengageable connection for transmitting the movement of said actuator to said driven clutch member to engage the clutch members, mechanism jointly responsive to the movements of said actuator and said driven member to disable said connection until said driven member has returned axially to said disengaged position and said actuator has also been returned to said inactive position and then to restore the connection, said mechanism comprising a latch element movable with said driven clutch member along a path extending axially of the latter, a coacting latch element movable with said actuator back and forth longitudinally of said path, and means for moving one of said elements transversely of said path and into and out of engagement with the other of said elements.

10. A drive mechanism having, in combination, a clutch having rotary driving and driven members with teeth thereon engageable and disengageable by axial shifting of the driven member, means operable after partial engagement of said teeth to start said driven member and shift the latter into full engagement with the driving teeth, means operable to shift said driven member out of engagement with the driving member to a disengaged position after a predetermined limited movement of the driven member with said driving member, a manually operable actuator movable between idle and limit positions, a disengageable connection for transmitting the movement of said actuator to said driven clutch member to engage the clutch members, and mechanism jointly responsive to the movement of said actuator and axial movement of said driven member to disable said connection until said driven member has returned axially to said disengaged position and said actuator has also been returned to said idle position and then to restore the connection.

11. A drive mechanism having, in combination, a rotary clutch having toothed driving and driven members normally urged out of engagement, a manually operable actuator movable out of a normally idle position to engage the clutch, a connection for transmitting the motion of said actuator to a member of the clutch to move the member axially and engage the clutch, said connection including latch elements engageable with each other to complete the connection, means operable as an incident to axial movement of said clutch member after initial engagement of the clutch to disengage said latch elements from each other irrespective of the position of said actuator, and means for maintaining such disengagement until said clutch members have been fully disengaged and said actuator has been returned to said idle position.

References Cited in the file of this patent

UNITED STATES PATENTS

| | | |
|---|---|---|
| 413,490 | Brooks | Oct. 22, 1889 |
| 784,653 | Byer | Mar. 14, 1905 |
| 843,030 | Jones et al. | Feb. 5, 1907 |
| 945,551 | Knoell | Jan. 4, 1910 |
| 1,027,262 | Levey | May 21, 1912 |
| 1,153,831 | Slentz | Sept. 14, 1915 |
| 1,383,525 | Carroll | July 5, 1921 |
| 1,604,598 | Osswald | Oct. 26, 1926 |

FOREIGN PATENTS

| | | |
|---|---|---|
| 155,662 | Germany | Nov. 17, 1904 |